United States Patent
Schuck (10) Patent No.: US 9,944,122 B2
(45) Date of Patent: Apr. 17, 2018

(54) AXLE SUSPENSION SYSTEM HAVING AN AXLE WRAP AND METHOD OF MANUFACTURE

(71) Applicant: ArvinMeritor Technology, LLC, Troy, MI (US)

(72) Inventor: Luis Gustavo Schuck, Troy, MI (US)

(73) Assignee: ArvinMeritor Technology LLC, Troy, MI (US)

( * ) Notice: Subject to any disclaimer, the term of this patent is extended or adjusted under 35 U.S.C. 154(b) by 0 days.

(21) Appl. No.: 15/051,968

(22) Filed: Feb. 24, 2016

(65) Prior Publication Data

US 2017/0239988 A1 Aug. 24, 2017

(51) Int. Cl.

| B60B 35/00 | (2006.01) |
|---|---|
| B23K 31/02 | (2006.01) |
| B60B 35/04 | (2006.01) |
| B60G 9/02 | (2006.01) |
| B60G 9/00 | (2006.01) |

(Continued)

(52) U.S. Cl.
CPC .......... *B60B 35/006* (2013.01); *B23K 31/027* (2013.01); *B60B 35/004* (2013.01); *B60B 35/04* (2013.01); *B60G 9/003* (2013.01); *B60G 9/02* (2013.01); *B23K 2201/006* (2013.01); *B23K 2201/06* (2013.01); *B60B 35/007* (2013.01); *B60B 35/008* (2013.01); *B60B 2310/302* (2013.01); *B60G 2200/31* (2013.01); *B60G 2200/326* (2013.01); *B60G 2204/4306* (2013.01); *B60G 2206/8201* (2013.01)

(58) Field of Classification Search
CPC . B60B 35/006; B60B 35/04; B60B 2310/302; B60B 35/007; B60B 35/008; B23K 31/027; B23K 2201/06; B23K 2201/006; B60G 9/02; B60G 2206/8201; B60G 2200/326; B60G 9/00; B60G 9/003; B60G 3/20; B60G 2200/31; B60G 2204/148; B60G 2204/4306; Y10T 403/7045; Y10T 403/7094

USPC ......... 301/124.1, 125, 127, 129; 280/124.11, 280/124.116, 124.128, 124.153; 180/378; 403/363, 381

See application file for complete search history.

(56) References Cited

U.S. PATENT DOCUMENTS

| 1,952,955 A | 3/1934 | Trageser et al. |
| 2,120,007 A | 6/1983 | Tear |

(Continued)

FOREIGN PATENT DOCUMENTS

| DE | 102013212545 A1 | 12/2014 | |
| FR | 2676249 A1 * | 11/1992 | ............... E05C 9/08 |

(Continued)

OTHER PUBLICATIONS

United States Patent and Trademark Office, U.S. Appl. No. 14/638,049, filed Mar. 4, 2015.

(Continued)

*Primary Examiner* — S. Joseph Morano
*Assistant Examiner* — Jean Charleston
(74) *Attorney, Agent, or Firm* — Brooks Kushman P.C.

(57) ABSTRACT

An axle suspension system and a method of manufacture. The axle suspension system may have an axle, an axle wrap, and a weld seam. The axle wrap may have first and second wrap portions that mechanically interlock with each other and that have overlapping ends that may receive a weld seam.

14 Claims, 6 Drawing Sheets

(51) Int. Cl.
   *B23K 101/00* (2006.01)
   *B23K 101/06* (2006.01)

(56) References Cited

U.S. PATENT DOCUMENTS

| | | | |
|---|---|---|---|
| 4,693,486 A | 9/1987 | Pierce et al. | |
| 4,995,636 A | 2/1991 | Hall et al. | |
| 5,112,078 A | 5/1992 | Galazin et al. | |
| 5,366,237 A | 11/1994 | Dilling et al. | |
| 5,375,871 A | 12/1994 | Mitchell et al. | |
| 5,690,353 A * | 11/1997 | Vandenberg | B60G 7/001 280/124.116 |
| 6,241,266 B1 | 6/2001 | Smith et al. | |
| 6,491,314 B2 | 12/2002 | Smith et al. | |
| 6,508,393 B2 | 1/2003 | Chalin | |
| 6,508,482 B2 | 1/2003 | Pierce et al. | |
| 6,557,875 B2 | 5/2003 | Schlosser et al. | |
| 6,672,604 B2 | 1/2004 | Eveley | |
| 6,827,360 B2 | 12/2004 | Chan et al. | |
| 6,843,490 B2 | 1/2005 | Raidel, II et al. | |
| 7,048,288 B2 | 5/2006 | Chan et al. | |
| 7,077,411 B2 | 7/2006 | Peters et al. | |
| 7,171,988 B2 | 2/2007 | Gejima et al. | |
| 7,270,342 B2 * | 9/2007 | Chan | B60G 7/001 280/124.116 |
| 7,360,774 B2 | 4/2008 | Saieg et al. | |
| 7,484,744 B2 | 2/2009 | Galazin et al. | |
| 7,607,670 B2 * | 10/2009 | Raidel, II | B60G 9/003 280/124.11 |
| 7,669,866 B2 | 3/2010 | Peaker et al. | |
| 7,717,442 B2 | 5/2010 | Chalin | |
| 7,726,673 B2 | 6/2010 | Saieg et al. | |
| 7,731,211 B2 | 6/2010 | Ramsey | |
| 7,740,255 B2 | 6/2010 | Holt | |
| 8,002,297 B2 | 8/2011 | Keiserman | |
| 8,006,987 B2 | 8/2011 | Saieg et al. | |
| 8,029,008 B2 | 10/2011 | Cortez et al. | |
| 8,333,396 B2 * | 12/2012 | Saieg | B60G 9/003 280/124.116 |
| 8,528,923 B2 | 9/2013 | Wakefield et al. | |
| 8,991,839 B1 | 3/2015 | Saieg et al. | |
| 9,102,206 B1 | 8/2015 | Saieg et al. | |
| 2003/0111817 A1 | 6/2003 | Fader et al. | |
| 2006/0163834 A1 | 7/2006 | Brereton et al. | |
| 2007/0074940 A1 | 4/2007 | Narishima et al. | |
| 2008/0029988 A1 | 2/2008 | Saieg et al. | |
| 2013/0154224 A1* | 6/2013 | Wakefield | B60G 9/003 280/124.116 |
| 2015/0266350 A1 | 9/2015 | Morino | |
| 2016/0107495 A1 | 4/2016 | Spielmann et al. | |
| 2017/0190230 A1 | 7/2017 | Saieg et al. | |

FOREIGN PATENT DOCUMENTS

| | | |
|---|---|---|
| WO | 0046052 A1 | 8/2000 |
| WO | 0220289 A1 | 3/2002 |
| WO | 2014207019 A1 | 12/2014 |

OTHER PUBLICATIONS

European Patent Office, Extended European Search Report for the corresponding European Patent Application No. 16204018.2 dated Sep. 18, 2017.

* cited by examiner

AXLE SUSPENSION SYSTEM HAVING AN AXLE WRAP AND METHOD OF MANUFACTURE

TECHNICAL FIELD

This disclosure relates to an axle suspension system having an overlapping axle wrap and a method of manufacture.

BACKGROUND

An axle suspension system having an axle wrap is disclosed in U.S. Pat. No. 8,528,923.

SUMMARY

In at least one embodiment, an axle suspension system is provided. The axle suspension system may have an axle and an axle wrap. The axle may have an exterior axle surface. The axle wrap may extend around the exterior axle surface and may include a first wrap portion and a second wrap portion. The first wrap portion may be disposed on the exterior axle surface and may have a first end and a second end disposed opposite the first end. The second end may have a first set of teeth. The second wrap portion may be disposed on the exterior axle surface and may have a first end and a second end disposed opposite the first end. The second end of the second wrap portion may have a second set of teeth that may mechanically interlock with the first set of teeth. The first end of the second wrap portion may overlap the first end of the first wrap portion. A weld seam the may extend along the second end of the second wrap portion to fixedly couple the first wrap portion to the second wrap portion.

In at least one embodiment, a method of making an axle suspension system is provided. An axle wrap may be provided that may have a first wrap portion and a second wrap portion. The first wrap portion may have a first end and a first set of teeth disposed opposite the first end. The second wrap portion may be a separate component from the first wrap portion and may have a first end and a second set of teeth that may be disposed opposite the first end of the second wrap portion. The first wrap portion and the second wrap portion may be positioned on an axle such that the first set of teeth interlocks with the second set of teeth and the first end of the second wrap portion overlaps the first end of the first wrap portion. The axle wrap may be welded by providing a weld seam that may fixedly couple the first end of the second wrap portion to the first wrap portion. The weld seam may not engage the axle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
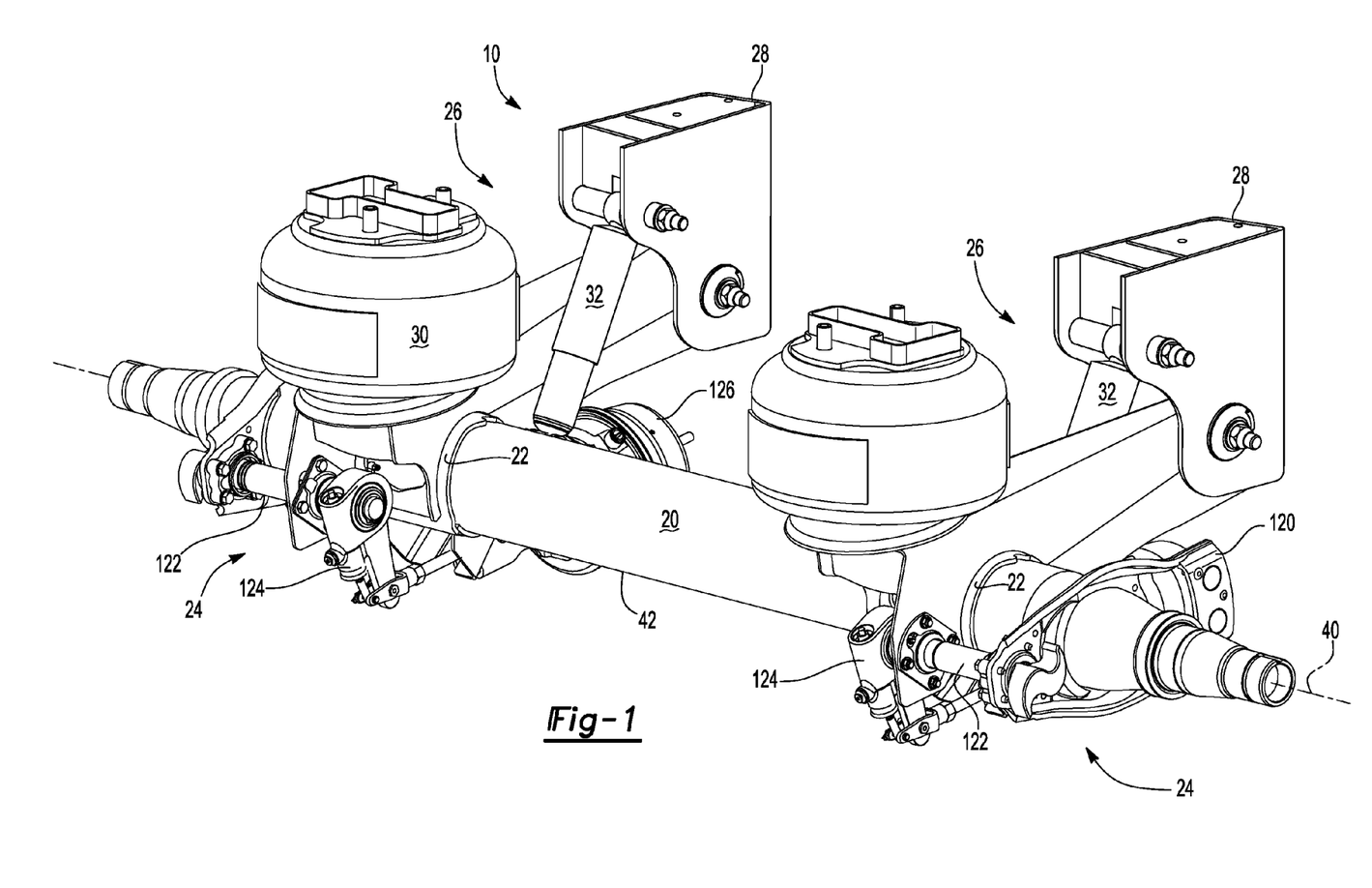
FIG. 1 is a perspective view of an axle suspension system having an axle wrap.

Referring to FIG. 1, an exemplary axle suspension system 10 is shown. The axle suspension system 10 may be provided with a vehicle, such as motor vehicle or a trailer that may be provided with a motor vehicle. The axle suspension system 10 may include an axle 20, an axle wrap 22, a brake subsystem 24, a trailing arm assembly 26, a hanger bracket 28, an air spring 30, and a shock absorber 32. In FIG. 1, a pair of axle wraps 22 is provided and one brake subsystem 24, trailing arm assembly 26, hanger bracket 28, air spring 30, and shock absorber 32 is associated with each axle wrap 22.

The axle 20 may extend along an axis 40 and may have an exterior axle surface 42. The exterior axle surface 42 may be an exterior circumference of the axle 20. At least one wheel hub assembly may be rotatably disposed on the axle 20. A wheel hub assembly may be provided at each end of the axle 20. Each wheel hub assembly may be configured to receive a wheel upon which a tire may be mounted.

Figure 2:
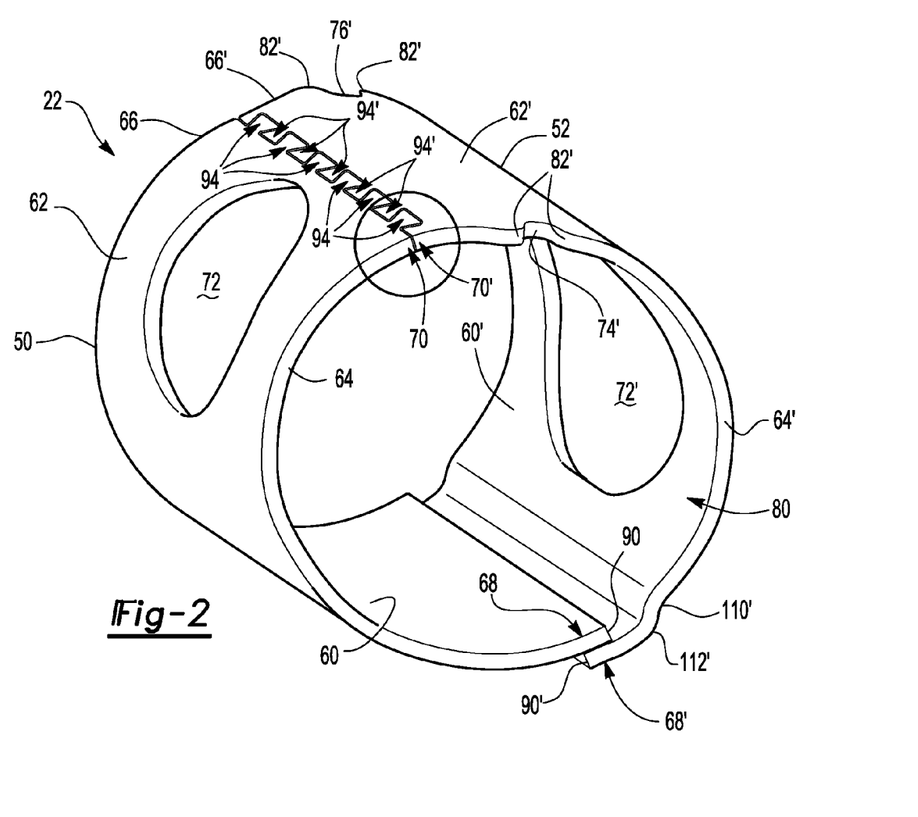
FIG. 2 is a perspective view of the axle wrap.
Figure 4:
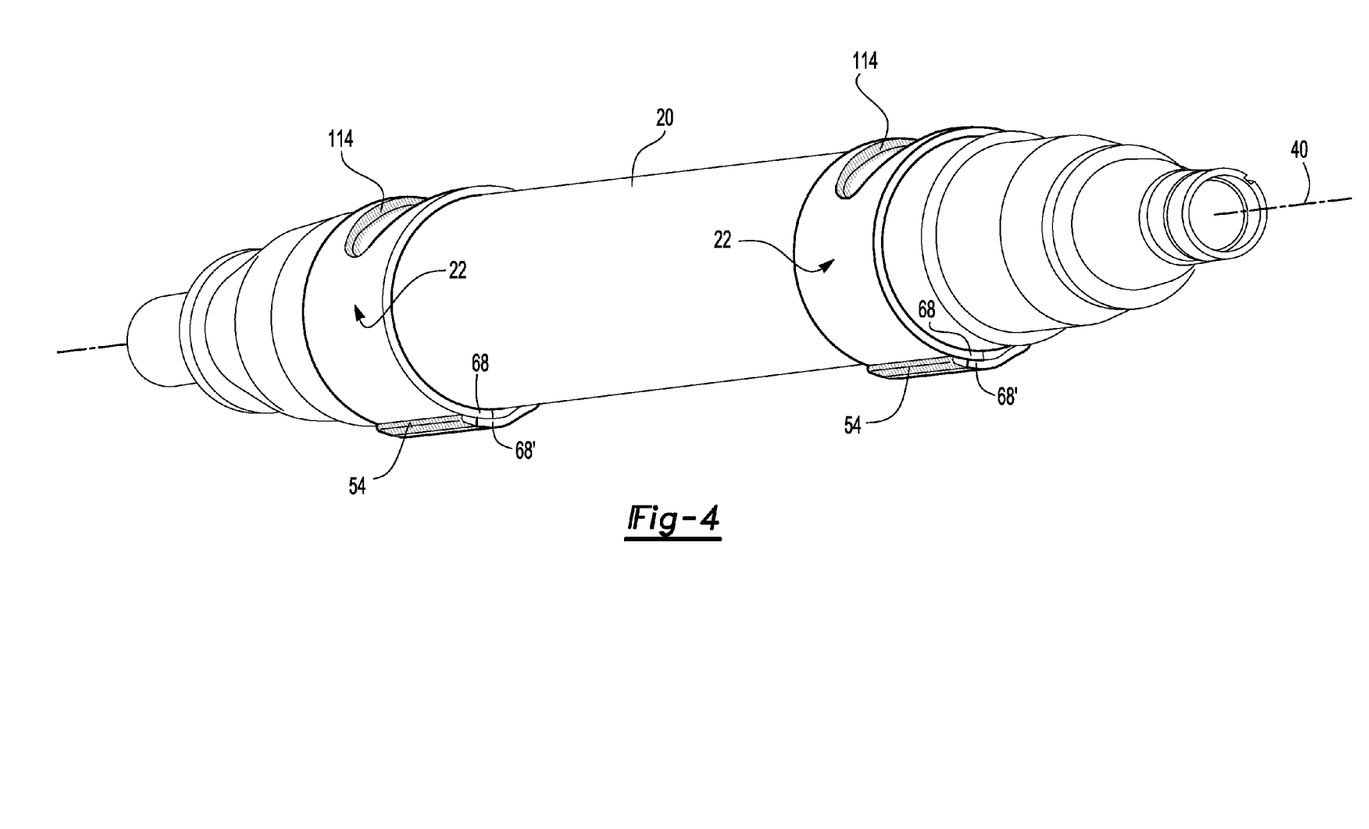
FIG. 4 is a perspective view of axle wraps that are welded to an axle.

Referring to FIGS. 1 and 2, the axle wrap 22 may be fixedly disposed on the axle 20. The axle wrap 22 may have a multi-piece construction that may include a first wrap portion 50 and a second wrap portion 52. The axle wrap 22 may extend around the exterior axle surface 42 of the axle 20. For example, the axle wrap 22 may extend completely around the exterior axle surface 42 by more than 360 degrees due to overlapping ends of the axle wrap 22. In FIG. 1, two axle wraps 22 are shown that are completely spaced apart from each other. Each axle wrap 22 may be positioned between an associated trailing arm assembly 26 and the axle 20 and may facilitate mounting of the trailing arm assembly 26 to the axle 20. The first wrap portion 50 and the second wrap portion 52 may mechanically interlock with each other as will be discussed in more detail below. As is best shown in FIG. 4, a weld seam 54 may be provided to fixedly couple the first wrap portion 50 to the second wrap portion 52.

Referring to FIG. 2, an example of a first wrap portion 50 is shown. The first wrap portion 50 may include an inner surface 60, and outer surface 62, a first side surface 64, a second side surface 66, a first end 68, a second end 70, and a weld window 72.

The inner surface 60 may be disposed on the exterior axle surface 42. The inner surface 60 may be disposed at a substantially constant radial distance from the axis 40. The inner surface 60 may not include any recesses or grooves that may extend partially through the axle wrap 22, such as may be provided to receive a backing strip that may bridge a gap between non-overlapping opposing ends of an axle wrap to accommodate gap variation that may be caused by axle diameter tolerances. The inner surface 60 may partially define an opening 80 or hole that may receive the axle 20.

The outer surface 62 may be disposed opposite the inner surface 60. In addition, the outer surface 62 may be disposed substantially parallel to the inner surface 60. As such, the axle wrap 22 may have a substantially constant thickness from the inner surface 60 to the outer surface 62.

The first side surface 64 may extend from the inner surface 60 to the outer surface 62. In addition, the first side surface 64 may be disposed substantially perpendicular to the exterior axle surface 42, the inner surface 60, and the outer surface 62 in one or more embodiments.

The second side surface 66 may be disposed opposite the first side surface 64. The second side surface 66 may extend from the inner surface 60 to the outer surface 62. In addition, the second side surface 66 may be disposed substantially perpendicular to the exterior axle surface 42, the inner surface 60, and the outer surface 62 in one or more embodiments.

Figure 6:
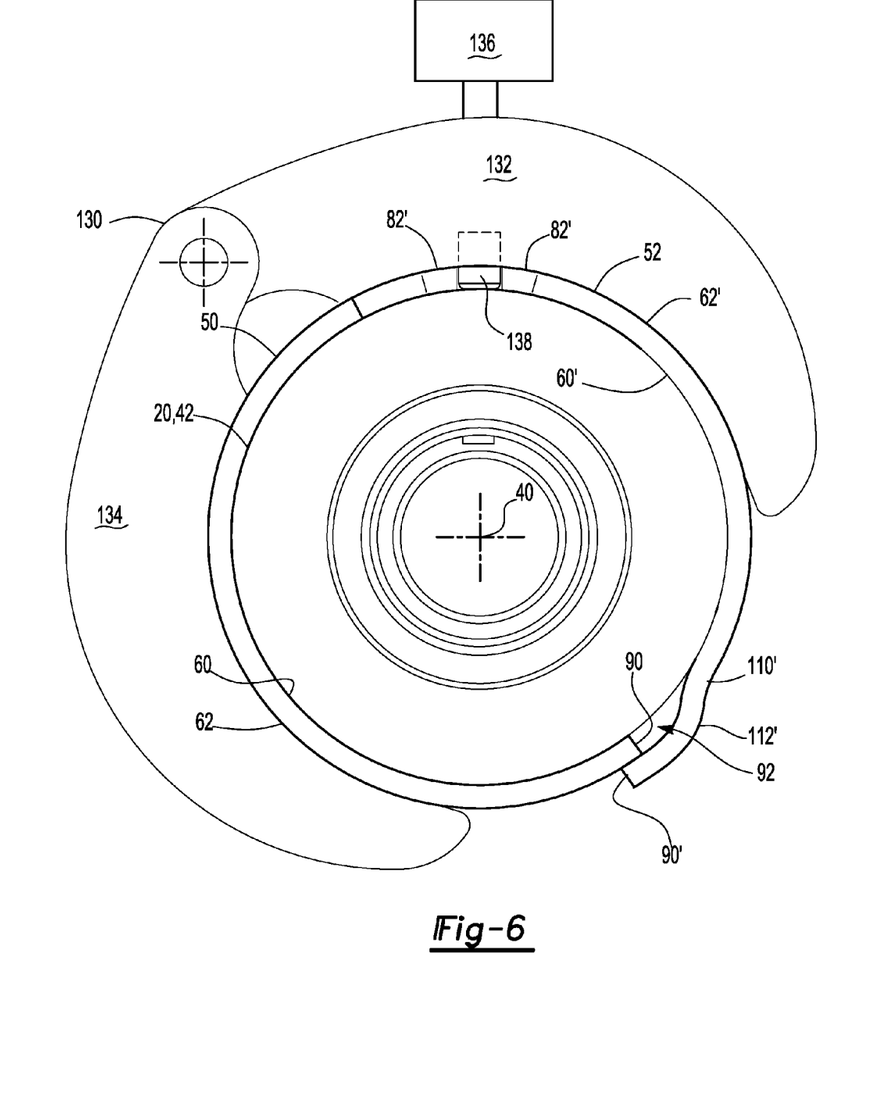
FIG. 6 shows the axle wrap compressed against the axle.

The first end 68 may be disposed at an end of the first wrap portion 50 and may be overlapped by the second wrap portion 52. The first end 68 may have a first end surface 90. The first end surface 90 may extend from the inner surface 60 to the outer surface 62 and may extend from the first side surface 64 to the second side surface 66. The first end surface 90 may extend from the exterior axle surface 42 to a region of the inner surface 60 that may be provided with the second wrap portion 52. The first end surface 90 may face toward and may be spaced apart from a region of the inner surface of the second wrap portion 52 that may extend outwardly away from the axle 20 and may be overlap the first end surface 90. As such, a small gap 92 may be located adjacent to the first end surface 90 as is best shown in FIG. 6. For instance, the gap 92 may be located between the first end surface 90, exterior axle surface 42, and a region of the inner surface that may be provided with the second wrap portion 52.

The second end 70 of the first wrap portion 50 may be disposed opposite the first end 68. The second end 70 may have a first set of teeth 94. The first set of teeth 94 may extend from the inner surface 60 to the outer surface 62 and may be arranged between the first side surface 64 and the second side surface 66. Members of the first set of teeth 94 may be spaced apart from each other and may have a dovetail configuration. As such, each pair of adjacent members of the first set of teeth 94 may cooperate to define a dovetail opening 96. Each dovetail opening 96 of the first set of teeth 94 may receive a member of a second set of teeth that may be provided with the second wrap portion 52 as will be discussed in more detail below.

Each member of the first set of teeth 94 that has a dovetail configuration may have a first tooth side surface 100, a second tooth side surface 102, and an outer tooth connecting surface 104. The first tooth side surface 100 may be disposed opposite the second tooth side surface 102. The outer tooth connecting surface 104 may extend from an end of the first tooth side surface 100 to an end of the second tooth side surface 102. In addition the first tooth side surface 100 and the second tooth side surface 102 may be disposed in a non-parallel relationship in which the first tooth side surface 100 and the second tooth side surface 102 are disposed further apart from each other at the outer tooth connecting surface 104. An inner tooth connecting surface 106 may extend from the first tooth side surface 100 of one tooth 94 to the second tooth side surface 102 of an adjacent tooth 94.

A weld window 72 may be provided with the first wrap portion 50. As is best shown in FIG. 4, the weld window 72 may receive a weld 114 that may join the first wrap portion 50 to the axle 20. The weld window 72 may be completely disposed in the first wrap portion 50. As such, the weld window 72 may extend from the inner surface 60 to the outer surface 62. The weld window 72 may be completely disposed above the first end 68 and the weld seam 54. In addition, the weld window 72 may be disposed closer to the first set of teeth 94 than to the first end 68. The weld window 72 may be positioned such that the center of a weld window 72 may be located above the neutral axis of the axle 20, which may help reduce stress on a weld 114. Positioning the center of a weld window 72 above the neutral axis of the axle 20 may move the bottom of a weld window upward and away from the higher tensile stress area at the bottom of the axle 20, which in turn may allow the portion of the weld 114 located at the bottom of a weld window 72 to be located closer to the neutral axis, thereby helping reduce tensile stress on the weld 114 that may occur when the axle 20 bends or flexes.

Figure 3:
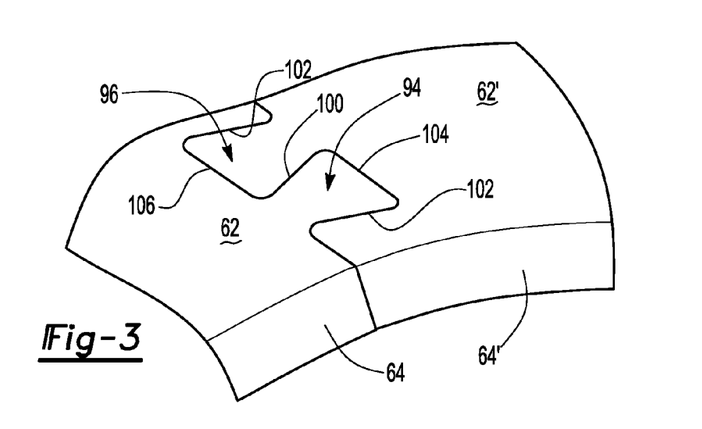
FIG. 3 is a magnified view of a portion of FIG. 2.

Referring to FIGS. 2 and 3, an example of a second wrap portion 52 is shown. The second wrap portion 52 may include an inner surface 60', an outer surface 62', a first side surface 64', a second side surface 66', a first end 68', a second end 70', a weld window 72', a first slot 74', and a second slot 76'.

The inner surface 60' may be at least partially disposed on the exterior axle surface 42. Most of the inner surface 60' may be disposed at a substantially constant radial distance from the axis 40, with the exception of the first end 68'. The inner surface 60' may not include any recesses or grooves that may extend partially through the second wrap portion 52, such as may be provided to receive a backing strip that may bridge a gap between non-overlapping opposite ends of an axle wrap to accommodate gap variation that may be caused by axle diameter tolerances. The inner surface 60' may at least partially define the opening 80 that may receive the axle 20.

The outer surface 62' may be disposed opposite the inner surface 60'. In addition, the outer surface 62' may be disposed substantially parallel to the inner surface 60'. As such, the second wrap portion 52 may have a substantially constant thickness from the inner surface 60' to the outer surface 62'.

The first side surface 64' may extend from the inner surface 60' to the outer surface 62'. In addition, the first side surface 64' may be disposed substantially perpendicular to the exterior axle surface 42, the inner surface 60', and the outer surface 62' in one or more embodiments.

The second side surface 66' may be disposed opposite the first side surface 64'. The second side surface 66' may extend from the inner surface 60' to the outer surface 62'. In addition, the second side surface 66' may be disposed substantially perpendicular to the exterior axle surface 42, the inner surface 60', and the outer surface 62' in one or more embodiments.

The first end 68' may have a first end surface 90'. The first end surface 90' may extend from the inner surface 60' to the outer surface 62' and may extend from the first side surface 64' to the second side surface 66'. The first end 68' of the second wrap portion 52 may overlap the first end 68 of the first wrap portion 50 such that the first end 68 of the first wrap portion 50 may be disposed between the exterior axle surface 42 of the axle 20 and the second wrap portion 52. For instance, the first end 68' of the second wrap portion 52 may bend away from the exterior axle surface 42 at a first bend 110' and may bend again at a second bend 112'. The region of the inner surface 60' located between the second bend 112' and the first end surface 90' may be disposed substantially parallel to the region of the outer surface 62 of the first wrap portion 50.

The second end 70' of the second wrap portion 52 may be disposed opposite the first end 68'. The second end 70' may have a second set of teeth 94'. The second set of teeth 94' may extend from the inner surface 60' to the outer surface 62' and may be arranged between the first side surface 64' and the second side surface 66'. Members of the second set of teeth 94' may be spaced apart from each other and may have a dovetail configuration as previously described with respect to the first set of teeth 94. As such, each pair of adjacent members of the second set of teeth 94' may cooperate to define a dovetail opening 96'. Each dovetail opening 96' of the second set of teeth 94' may receive a member of a first set of teeth 94 that may be provided with the first wrap portion 50. The first set of teeth 94 and the second set of teeth 94' may be disposed directly opposite or on an opposite side of the axis 40 from the first end 68 of the first wrap portion 50. In addition, the first set of teeth 94 and the second set of teeth 94' may be disposed between the weld windows 72, 72' of the first wrap portion 50 and the second wrap portion 52, respectively.

A weld window 72' may be provided with the second wrap portion 52. As is best shown in FIG. 4, the weld window 72' may receive a weld 114 that may join the second wrap portion 52 to the axle 20. The weld window 72' may be configured as a through hole may be completely disposed in the second wrap portion 52. As such, the weld window 72' may extend from the inner surface 60' to the outer surface 62'. The weld window 72' may be positioned such that the center of a weld window 72' may be located above the neutral axis of the axle 20 as previously discussed.

The first slot 74' may be disposed proximate the top of the axle 20 and may facilitate assembly of the second wrap portion 52 to the axle 20 as will be discussed in more detail below. The first slot 74' may be provided in the first side surface 64' or may extend into the first side surface 64' and toward the second side surface 66'. In addition, the first slot 74' may extend from the inner surface 60' to the outer surface 62'. The first slot 74' may be an open ended slot that may be defined by a curved or arcuate surface.

The first slot 74' may be disposed proximate or adjacent to one or more protrusions 82'. In FIG. 2, two protrusions 82' are shown that are disposed on opposite sides of the first slot 74' such that the first slot 74' may extend from a first protrusion 82' to a second protrusion 82'. The first and second protrusions 82' may be disposed on the exterior axle surface 42 and may extend away from the second side surface 66'. The protrusions 82' may extend outwardly from the first side surface 64' or may be configured as bulges in the first side surface 64'. In addition, the protrusions 82' may extend along an arc or curve with respect to the first slot 74' and an adjacent portion of the first side surface 64'. Such a configuration may help reduce localized stress concentrations in the axle wrap 22.

The second slot 76' may be disposed opposite the first slot 74'. For example, the second slot 76' may be disposed proximate the top of the axle 20. The second slot 76' may be provided in the second side surface 66' or may extend into the second side surface 66' and toward the first side surface 64'. In addition the second slot 76' may extend from the inner surface 60' to the outer surface 62'. The second slot 76' may also facilitate assembly of the axle wrap 22 to the axle 20 as will be discussed in more detail below. The second slot 76' may be disposed proximate or adjacent to one or more protrusions 82' similar to the protrusions 82' associated with the first slot 74'.

Referring to FIG. 4, the weld seam 54 may fixedly couple the first end 68 of the first wrap portion 50 to the first end 68' of the second wrap portion 52. The weld seam 54 may be provided on the outer surface 62 of the first wrap portion 50 adjacent to the first end surface 90' of the second wrap portion 52 and may extend the full thickness of the second wrap portion 52. The weld seam 54 may extend continuously across the axle wrap 22, such as from the first side surface 64 to the second side surface 66. In addition, the weld seam 54 may be spaced apart from and may not engage the axle 20.

Referring to FIG. 1, the brake subsystem 24 may be configured to brake or inhibit rotation of an associated wheel hub assembly. The brake subsystem 24 may be mounted to the axle 20 proximate an end of the axle 20. The brake subsystem 24 may be configured as a friction brake, such as a drum brake assembly. In at least one embodiment, the brake subsystem 24 may include a brake torque plate or a brake spider 120, a cam shaft 122, a slack adjuster 124, and an actuator 126.

The brake spider 120 may facilitate mounting of the brake assembly to the axle 20. The brake spider 120 may be fixedly disposed on the axle 20 between the wheel hub assembly or an end of the axle 20 and the trailing arm assembly 26.

The cam shaft 122 may be mounted to the brake spider 120 and the trailing arm assembly 26. The cam shaft 122 may include a brake cam, which may also be referred to as an S-cam. The brake cam may be disposed at a first end of the cam shaft 122 and may be configured to actuate one or more brake pad assemblies when the cam shaft 122 is rotated or pivoted about its axis.

The slack adjuster 124 may be provided to compensate for friction brake wear or wear of friction material of a brake pad of the brake subsystem 24. The slack adjuster 124 may disposed at second end of the cam shaft 122.

The actuator 126 may actuate the cam shaft 122 and its brake cam to apply or release the friction brake. The actuator 126 may be of any suitable type, such as a pneumatic actuator or an electronic actuator. The actuator 126 may include an actuator shaft that may extend to the slack adjuster 124. The actuator shaft may move between a retracted position and an extended position. The cam shaft 122 may rotate in response to extension of the actuator shaft such that the brake subsystem 24 may inhibit rotation of an associated wheel hub assembly.

The trailing arm assembly 26 may be fixedly disposed on the axle wrap 22, such as by welding. The trailing arm assembly 26 may be disposed between and may be spaced apart from the first side surface 64 and the second side surface 66 of the axle wrap 22. In addition, the trailing arm assembly 26 may be disposed between and may be spaced apart from the first slot 74' and the second slot 76'.

The hanger bracket 28 may facilitate mounting of the axle suspension system 10 to a frame or chassis of the vehicle. The hanger bracket 28 may be spaced apart from the axle 20 and may be pivotally mounted to the trailing arm assembly 26. The shock absorber 32 may be pivotally mounted to the hanger bracket 28.

The air spring 30 may be mounted to the trailing arm assembly 26. The air spring 30 may be located between the trailing arm assembly 26 and the frame or chassis of the vehicle.

The shock absorber 32 may be provided to dampen impulses and to dissipate kinetic energy transmitted to the axle suspension system 10. The shock absorber 32 may be pivotally mounted to the hanger bracket 28 at a first end and may be pivotally mounted to the trailing arm assembly 26 at a second end.

Figure 7:
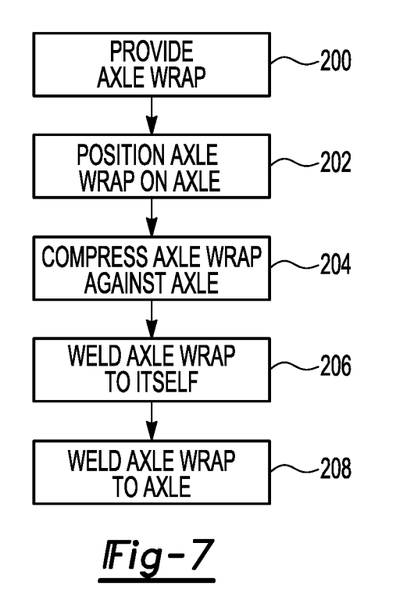
FIG. 7 is a flowchart of a method of making an axle suspension system.

Referring to FIG. 7, a flowchart of an exemplary method of making an axle suspension system is shown.

At block 200, the axle wrap may be provided or fabricated. For instance, the first wrap portion 50 and the second wrap portion 52 may be made from a sheet of material, such as sheet metal. The sheet may be stamped to form blanks that may define the outer perimeter surfaces of the first wrap portion 50 and the second wrap portion 52 and the weld windows 72, 72'. In addition, the first end 68' of the second wrap portion 52 may be formed, bent, and offset from the remainder of the blank during stamping or in a subsequent bending process. Next, the blank may be formed around a die, such as a horn die, into the generally cylindrical or tubular axle wrap configuration shown in FIG. 4.

At block 202, the axle wrap may be positioned on the axle. For instance, the first wrap portion 50 and the second wrap portion 52 may be placed on the exterior axle surface 42 at a desired attachment location and the first set of teeth 94 may be interlocked with the second set of teeth 94'. Once interlocked, the first wrap portion 50 and the second wrap portion 52 may fit snugly against the axle 20 or may fit loosely against the axle 20. If desired, the axle wrap 22 may be compressed against the axle 20 prior to welding. For instance, the axle wrap 22 may have a larger inside diameter than the outside diameter of the axle 20 before the axle wrap 22 is compressed against the axle 20.

Figure 5:
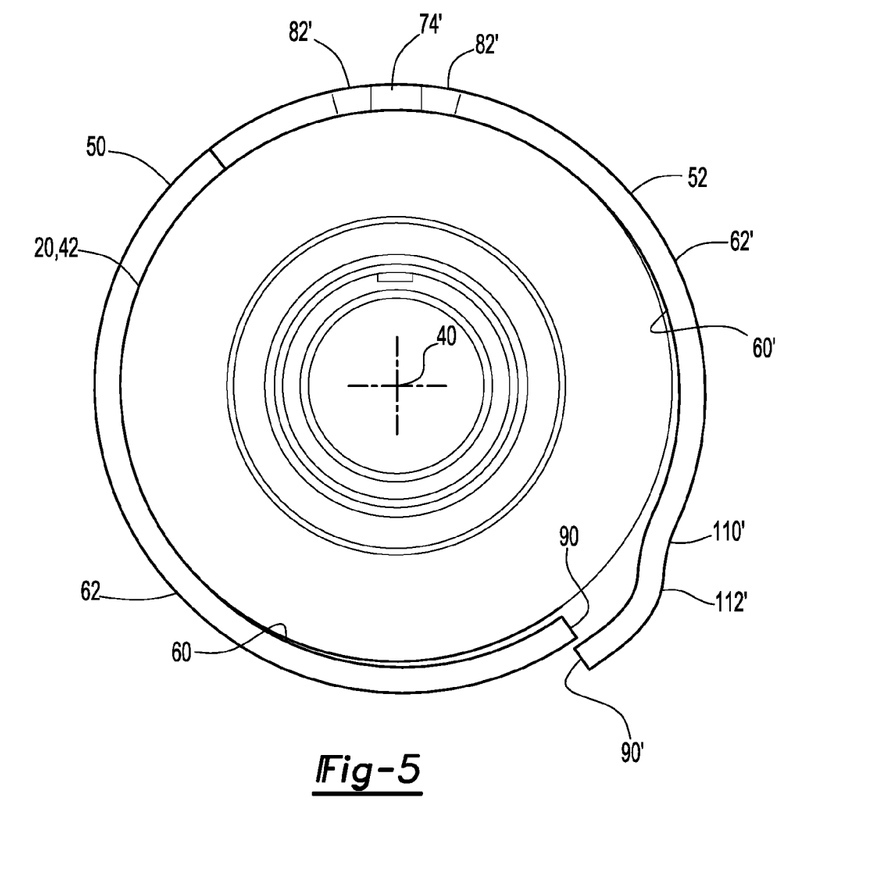
FIG. 5 shows the axle wrap disposed on an axle prior to compressing the axle wrap.

At block 204, the axle wrap may optionally be compressed against the axle. Compression of the axle wrap 22 is best shown by comparing FIG. 5 to FIG. 6. In FIG. 5, the axle wrap 22 is not compressed against the axle 20. As such, there may be a gap between the inner surface 60' of the second wrap portion 52 and the exterior axle surface 42 of the axle 20. In FIG. 6, the axle wrap 22 is compressed against the axle 20. The axle wrap 22 may move closer to the axle 20 when axle wrap 22 is compressed. As such, the axle wrap 22 may engage substantially the entire exterior axle surface 42 when the axle wrap 22 is compressed. In addition, due to the overlapping first wrap portion 50 and second wrap portion 52, the first end surface 90' of the second wrap portion 52 may move away from the first end surface 90 of the first wrap portion 50 when the axle wrap 22 is compressed. As such, the axle wrap 22 may accommodate axle diameter variation without the use of any backing strips.

The axle wrap 22 may be compressed against the axle 20 with a clamp unit 130. An exemplary claim unit 130 is shown in FIG. 6. The clamp unit 130 may engage and exert force on the outer surfaces 62, 62' to compress the axle wrap 22 toward the axle 20 or toward the axis 40. In at least one embodiment, the clamp unit 130 may include a first clamp 132 and a second clamp 134 that may be positionable with respect to each other. For instance, the first clamp 132 and the second clamp 134 may pivot with respect to each other about a pivot axis. At least one actuator 136 may actuate the first clamp 132, the second clamp 134, or the first clamp 132 and the second clamp 134. The actuator 136 may be of any suitable type, such as a hydraulic cylinder.

A portion of the clamp unit 130, such as the first clamp 132 or the second clamp 134, may be provided with one or more pins 138 that may help locate and position the axle wrap 22 with respect to the clamp unit 130. For instance a first pin 138 may be received in the first slot 74' of the second wrap portion 52 and a second pin 138 may be received in the second slot 76' of the second wrap portion 52 to position the axle wrap 22 with respect to the axle 20. The second pin 138 may be disposed behind the first pin 138 and the axle wrap 22 from the perspective shown in FIG. 6.

At block 206, the axle wrap 22 may be welded to itself. More specifically, the weld seam 54 may be provided to fixedly couple the first wrap portion 50 to the second wrap portion 52, but may not weld the axle wrap 22 to the axle 20. The weld seam 54 may be provided on the outer surface 62 of the first wrap portion 50 and may not engage the axle 20 as previously discussed. The clamp unit 130 may continue to compress the axle wrap 22 when the axle wrap 22 is provided with the weld seam 54. In addition, weld seam 54 may be allowed to cool before welding the axle wrap 22 to the axle 20. Allowing the weld seam 54 to cool may allow the weld seam 54 to contract to help further secure the axle wrap 22 against the axle 20.

At block 208, the axle wrap 22 may be welded to the axle 20. The axle wrap 22 may be welded to the axle 20 by providing at least one weld 114 in at least one weld window 72, 72' of the axle wrap 22. Such a weld may extend continuously around the weld window 72, 72' in one or more embodiments.

The system and method described above may allow an axle wrap to be provided and assembled to an axle without additional components, such as a backing strip and ceramic tape that may be disposed between the axle wrap and the axle. A backing strip may bridge the gap between opposite end surfaces of the axle wrap. Such backing strips may be provided in multiple sizes and may be custom fit to the axle, which increases cost and manufacturing steps. Because the backing strip will not be a perfect fit, ceramic tape is provided between the backing strip and the axle to prevent the weld from contacting the axle. As such, eliminating the backing strip may allow the ceramic tape to be eliminated, which may also reduce cost and manufacturing steps.

Eliminating the backing strip also allows an axle wrap to be provided without machining grooves or recesses in the inner surface to accommodate the backing strip. For instance, grooves may be provided at opposite ends of the axle wrap that provide space to receive the backing strip. Such grooves or recesses may reduce the thickness of the axle wrap and may reduce the strength of the axle wrap as compared with the present invention. Providing a backing strip may also reduce the height or thickness of a weld that may be provided between the ends of the axle wrap, which reduces strength. As such, the height of the weld seam may be equal to the full thickness of the axle wrap, which may allow an axle wrap to be provided with a reduced material thickness as compared to an axle wrap that employs a backing strip, thereby reducing cost and weight. In addition, providing an axle wrap with interlocking first and second wrap portions may be less expensive to fabricate as compared to a one piece axle wrap. Also, providing a two piece interlocking axle wrap may facilitate assembly when a brake spider is already assembled to the axle such that a one-piece axle wrap cannot be slid axially onto the axle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
   an axle having an exterior axle surface;
   an axle wrap that extends around the exterior axle surface, the axle wrap including:
   a first wrap portion that is disposed on the exterior axle surface and that has a substantially constant thickness from an inner surface that is disposed on the exterior axle surface to an outer surface disposed opposite the inner surface, a first end, a second end disposed opposite the first end, the second end having a first set of teeth; and a second wrap portion that is disposed on the exterior axle surface and that has a first end and a second end disposed opposite the first end, the first end of the second wrap portion having a first end surface, a first bend that bends away from the exterior axle surface, and a second bend disposed between the first bend and the first end surface, and the second end of the second wrap portion having a second set of teeth that mechanically interlock with the first set of teeth;

wherein the first end of the second wrap portion overlaps the first end of the first wrap portion between the first end surface and the second bend and a weld seam extends along the first end of the second wrap portion to fixedly couple the first wrap portion to the second wrap portion.

2. The axle suspension system of claim 1 wherein the weld seam is provided on an outer surface of the first wrap portion and does not engage the axle.

3. The axle suspension system of claim 1 wherein the axle extends along an axis and the first set of teeth and the second set of teeth are disposed on an opposite side of the axis from the first end of the first wrap portion.

4. The axle suspension system of claim 3 wherein the first wrap portion has a first weld window that is completely disposed in the axle wrap, the second wrap portion has a second weld window that is completely disposed in the second wrap portion, and the first set of teeth and the second set of teeth are disposed between the first weld window and the second weld window.

5. The axle suspension system of claim 4 wherein the first weld window and the second weld window each receive a weld that joins the axle wrap to the axle.

6. The axle suspension system of claim 4 wherein the second wrap portion has a first protrusion and a second protrusion that extend along the exterior axle surface, wherein the first set of teeth and the second set of teeth are disposed between the first protrusion and the first weld window.

7. The axle suspension system of claim 6 where the first set of teeth and the second set of teeth are disposed closer to the first weld window than to the first protrusion.

8. The axle suspension system of claim 4 wherein the second wrap portion has protrusions that extend from opposing side surfaces and extend along the exterior axle surface and the first set of teeth and the second set of teeth are disposed between the protrusions and the first weld window.

9. The axle suspension system of claim 1 wherein members of the first set of teeth have a dovetail configuration, wherein a dovetail opening is defined by and disposed between each pair of adjacent members of the first set of teeth, and the dovetail opening receives a member of the second set of teeth.

10. The axle suspension system of claim 9 wherein members of the first set of teeth that have a dovetail configuration include a first tooth side surface, a second tooth side surface disposed opposite the first tooth side surface, and an outer tooth connecting surface that extends from an end of the first tooth side surface to an end of the second tooth side surface, wherein the first tooth side surface and the second tooth side surface are disposed in a non-parallel relationship in which the first tooth side surface and the second tooth side surface are disposed furthest apart from each other at the outer tooth connecting surface.

11. The axle suspension system of claim 9 wherein no weld is provided where the first set of teeth interlocks with the second set of teeth.

12. The axle suspension system of claim 9 wherein members of the second set of teeth have a dovetail configuration, wherein a dovetail opening is defined by and disposed between each pair of adjacent members of the second set of teeth, and the dovetail opening associated with the second set of teeth receives a member of the first set of teeth.

13. The axle suspension system of claim 12 wherein members of the second set of teeth that have a dovetail configuration include a first tooth side surface, a second tooth side surface disposed opposite the first tooth side surface, and an outer tooth connecting surface that extends from an end of the first tooth side surface to an end of the second tooth side surface, wherein the first tooth side surface and the second tooth side surface are disposed in a non-parallel relationship in which the first tooth side surface and the second tooth side surface are disposed furthest apart from each other at the outer tooth connecting surface.

14. The axle suspension system of claim 13 wherein the outer tooth connecting surface of the first set of teeth is disposed substantially parallel to the outer tooth connecting surface of the second set of teeth.

\* \* \* \* \*